UNITED STATES PATENT OFFICE.

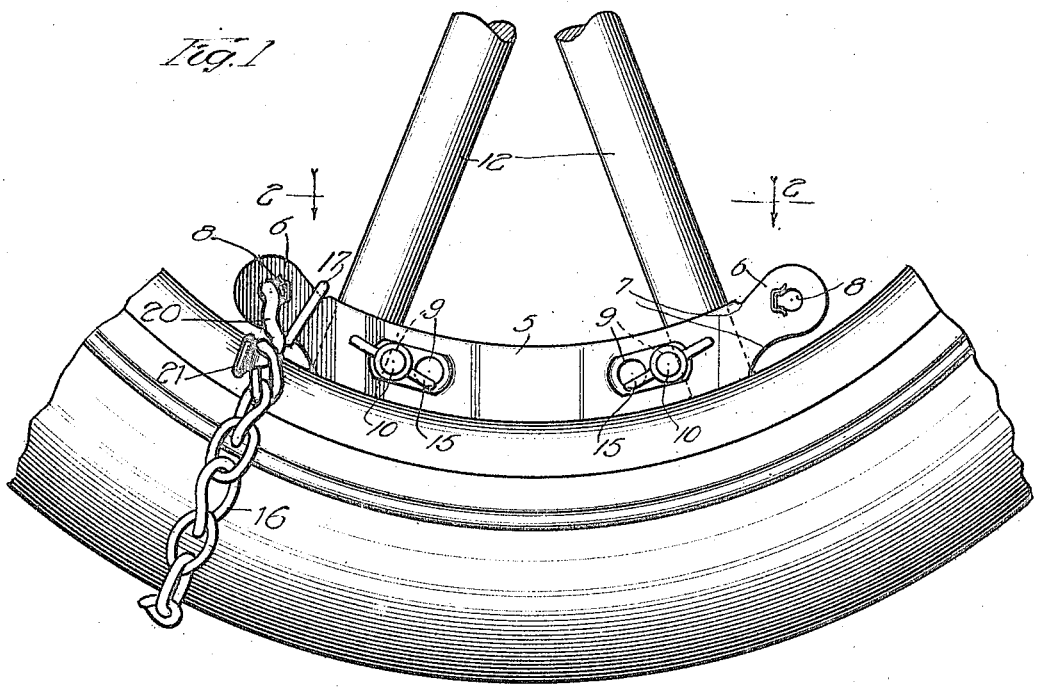
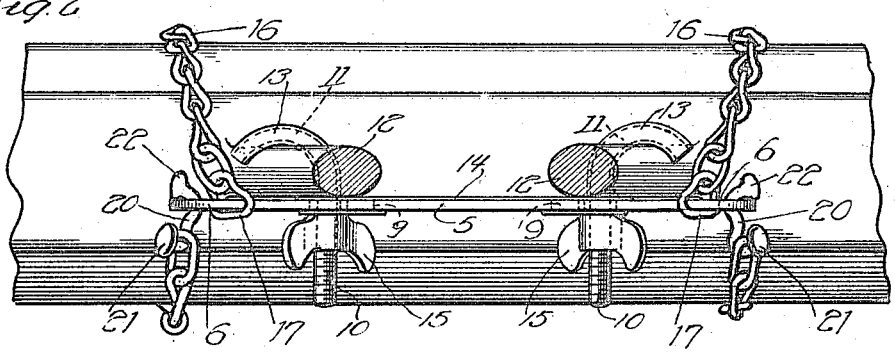
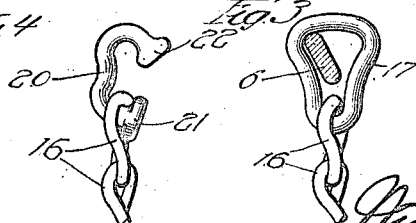

WILLIAM H. KRUG, OF OSHKOSH, WISCONSIN.

ANTISKID DEVICE.

1,412,786.

Specification of Letters Patent. Patented Apr. 11, 1922.

Application filed August 6, 1919. Serial No. 315,598.

*To all whom it may concern:*

Be it known that I, WILLIAM H. KRUG, a citizen of the United States, residing at Oshkosh, in the county of Winnebago and State of Wisconsin, have invented a certain new and useful Improvement in Antiskid Devices, of which the following is a full, clear, concise, and exact description, reference being had to the accompanying drawings, forming a part of this specification.

My invention relates to improvements in anti-skid devices, and is especially concerned with improvements in devices adapted to secure anti-skid chains to vehicle wheels. The objects of my invention are:

First: To provide means for securing anti-skid chains to vehicle wheels, which are extremely simple and economical to manufacture;

Second: To provide devices of the character described, which may be easily and quickly attached to and detached from a vehicle wheel;

Third: To provide means whereby the anti-skid chains may be quickly attached to and detached from the means for securing these chains to the vehicle wheels, the said means being so constructed that both ends of the anti-skid chain are positively locked to the securing means; and Fourth: To provide an anti-skid device in which a single means at one end of an anti-skid chain is used for locking both ends of the anti-skid chain to the device which secures the anti-skid chain to the vehicle wheel.

Other objects will appear as this description progresses, reference being had to the accompanying drawings, in which—

Figure 1 is a fragmentary side elevation of a vehicle wheel equipped with my invention;

Figure 2 is a fragmentary view looking at the inside edge of the means which I employ for securing anti-skid chains to vehicle wheels;

Figure 3 is a fragmentary detail showing the means which I employ for securing one end of the anti-skid chain; and Figure 4 is a view similar to Figure 3, showing the means which I employ for securing the opposite end of the anti-skid chain.

In the several views similar reference characters will be used to designate similar parts.

Referring to the drawings, the reference character 5 indicates a clamping bar the ends 6 of which are offset edgewise from the body portion of the clamp, and connected therewith by a part 7 having a reduced cross section or width, for a purpose which will be referred to later on. The offset ends are provided with keyhole slots 8. The body portion of the clamping bar 5 is provided with two sets of openings 9 for receiving the clamping bolts 10, which are provided with hook-shaped extremities 11 adapted to embrace the spokes 12 of the vehicle wheel. The hook-shaped extremities are preferably provided with a covering 13 of rubber or other suitable material for preventing abrasion of the spokes. A strip of fiber 14 is interposed between the spokes 12 and the clamping bar 5, to prevent abrasion of the spokes. This piece of fiber is provided with openings registering with the opening 9, through which the bolts 10 pass. The bolts 10 are provided with wing nuts 15 by means of which the clamping bars can be easily and quickly attached to or detached from the spokes.

One end of the anti-skid chain 16 is provided with a substantially triangular shaped link 17 having such dimensions that it will just pass over the enlarged part of the end portion 6 when the link is brought into the position shown in Figure 3 relative to the end portion 6. After the link 17 is passed over the enlarged part of the end portion 6, it swings freely upon the reduced portion 7, so that no twisting strains are exerted upon the clamping bar by reason of the pull exerted upon the anti-skid chain. It will be clear from this description that the link 17 co-acts with the enlarged part of the end portion to lock the end of the anti-skid chain to which the link 17 is attached, to the clamping bar, for the reason that the link 17 can be detached from the clamping bar only when it is positioned relative to the clamping bar in one of two different positions.

The links at the opposite end of the anti-skid chain are adapted to receive a coupling member 20, which is provided at one end with an enlargement 21, which prevents the links from being displaced therefrom, and at the opposite end with a cross head 22, which is adapted to be brought into registry with the keyhole opening 8 in one end of the clamping bar 5, and manipulated therethrough. When the coupling member 20 is released, it drops to a position in which the crosshead 22 cannot pass through the keyhole slot, and this end of the chain is consequently locked to the clamping bar 5; and since the coupling member 20 is engaged with the clamping bar outside of the link 17, it likewise prevents the link 17 from being displaced from the clamping bar.

I preferably drop forge the clamping bar 5, the link 17 and the coupling member 20, but it is to be clearly understood that these parts may be stamped from suitable sheet metal or otherwise constructed without departing from my invention.

While I have described the details of the preferred embodiment of my invention, it is to be clearly understood that my invention is not limited to these details but is capable of other adaptations and modifications within the scope of the appended claims.

Having thus described my invention, what I claim as new and desire to secure by Letters Patent is:

1. The combination with means for securing an anti-skid chain to a vehicle wheel, comprising a bar having a body portion and an edgewise offset end portion provided with a keyhole slot, the said end portion being reduced in cross section between said keyhole slot and said body portion, of an anti-skid chain having a link at one end adapted to pass over said end portion when brought in proper position relative thereto, and comprising means for locking said link to said bar when occupying any other position relative to said reduced portion, the other end of said anti-skid chain having a coupling member provided with a crosshead to be manipulated through said keyhole slot and to lock both ends of said anti-skid chain to said bar.

2. The combination with means for securing an anti-skid chain to a vehicle wheel, comprising a bar having a body portion and an edgewise offset end portion provided with a keyhole slot, of an anti-skid chain having a link at one end adapted to pass over said end portion, the other end of said anti-skid chain having a coupling member provided with a crosshead to be manipulated through said keyhole slot and to lock both ends of said anti-skid chain to said bar.

3. The combination with means for securing an anti-skid chain to a vehicle wheel, comprising a bar having a body portion and an edgewise offset end portion provided with an opening, of an anti-skid chain having a link at one end adapted to pass over said end portion, the other end of said anti-skid chain having a coupling member provided with a head to be manipulated through said opening and to lock both ends of said anti-skid chain to said bar.

4. The combination with means for securing an anti-skid chain to a wheel, comprising a bar having a body portion and an edgewise offset end portion, of an anti-skid chain having at one end a link adapted to pass over said edgewise offset end portion, and the other end of said chain being provided with means for securing said last-named end to said bar, and for locking said link to said bar.

5. The combination with means for securing an anti-skid chain to a wheel, comprising a bar having a body portion and an end portion extending substantially in the plane of said bar and at an angle thereto, of an anti-skid chain having at one end a link adapted to pass over said end portion, and the other end of said chain being provided with means for securing said last-named end to said bar, and for locking said link to said bar.

6. Means for securing an anti-skid chain to a wheel comprising a bar having one edge curved to conform to the inner periphery of the rim of said wheel and one end thereof extending away from said curved edge and substantially in the plane of said bar, said bar being reduced in cross section adjacent said end.

7. Means for securing an anti-skid chain to a wheel comprising a bar having one edge curved to conform to the inner periphery of the rim of said wheel and one end thereof extending away from said curved edge, said bar being reduced in cross section adjacent said end.

In witness whereof, I hereunto subscribe my name this 24th day of July, 1919.

WILLIAM H. KRUG.

Witnesses:
M. GOETSCHIUS,
GEO. A. ALLENDORF.